US006601163B1

(12) United States Patent
Cromer et al.

(10) Patent No.: US 6,601,163 B1
(45) Date of Patent: Jul. 29, 2003

(54) METHOD AND SYSTEM FOR EXECUTING ADAPTER CONFIGURATION ROUTINES UTILIZING DIFFERENT OPERATING MODES

(75) Inventors: Daryl Carvis Cromer, Apex, NC (US); Richard Alan Dayan, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/566,836

(22) Filed: May 8, 2000

(51) Int. Cl.$^7$ .............................................. G06F 15/177
(52) U.S. Cl. .................................. 713/1; 713/2
(58) Field of Search ................................. 713/1, 2, 100

(56) References Cited

U.S. PATENT DOCUMENTS

| | | | |
|---|---|---|---|
| 5,341,494 A | | 8/1994 | Thayer et al. |
| 5,481,709 A | * | 1/1996 | Bealkowski et al. ............ 713/1 |
| 5,497,497 A | | 3/1996 | Miller et al. |
| 5,659,748 A | | 8/1997 | Kennedy |
| 5,935,228 A | * | 8/1999 | Shinomura ................... 710/302 |
| 6,081,890 A | * | 6/2000 | Datta ............................ 713/1 |
| 6,128,731 A | * | 10/2000 | Zarrin et al. .................... 713/1 |
| 6,282,596 B1 | * | 8/2001 | Bealkowski et al. ......... 710/302 |
| 6,457,069 B1 | * | 9/2002 | Stanley ........................... 710/8 |
| 6,480,952 B2 | * | 11/2002 | Gorishek et al. ............. 712/227 |

OTHER PUBLICATIONS

IBM Technical Disclosure Bulletin, vol. 38, No. 03, Mar. 1995 (pp. 253–256).

IBM Technical Disclosure Bulletin, vol. 38, No. 03, Mar. 1995 (pp. 165–166).

IBM Technical Disclosure Bulletin, vol. 38, No. 03, Mar. 1995 (pp. 101–105).

IBM Technical Disclosure Bulletin, vol. 35, No. 07, Dec. 1992 (p. 253).

* cited by examiner

Primary Examiner—Dennis M. Butler
(74) Attorney, Agent, or Firm—Bracewell & Patterson, LLP; Carlos Munoz-Bustamante

(57) ABSTRACT

A method for configuring a data processing system that contains one or more first nonvolatile memories, one or more second nonvolatile memories, and processing resources that support at least first and second operating modes, begins with activation of the first operating mode. One or more secondary configuration routines that utilize a second operating mode are then found within the one or more second nonvolatile memories, and a list that identifies those secondary configuration routines is stored. After the list is stored, one or more primary configuration routines which utilize the first operating mode are located within the one or more first nonvolatile memories and executed. Also, all of the secondary configuration routines that do not correspond to any of the primary configuration routines are demarcated. Thereafter, the second operating mode is activated in lieu of the first operating mode, and the demarcated secondary configuration routines are executed. In an illustrative embodiment, the primary configuration routines are obtained from system memory, the secondary configuration routines are obtained from adapter memory, and one or more of the primary configuration routines are executed in lieu of one or more corresponding secondary configuration routines.

23 Claims, 4 Drawing Sheets

METHOD AND SYSTEM FOR EXECUTING ADAPTER CONFIGURATION ROUTINES UTILIZING DIFFERENT OPERATING MODES

BACKGROUND OF THE INVENTION

1. Technical Field

The present invention relates in general to data processing systems and, in particular, to methods and systems for configuring data processing systems to accommodate various hardware components. Still more particularly, the present invention relates to a method and system for supporting adapter card configuration routines designed for an operating mode that differs from the data processing system's default operating mode.

2. Description of the Related Art

When a general purpose data processing system such as a personal computer is started or restarted, the processing resources of the data processing system prepare the system for useful work by automatically executing a startup routine. The startup routine typically tests various hardware components of the system and then configure those hardware components so that they may be utilized by software, such as the operating system and application programs. The process of automatically configuring the hardware components at startup is also known as "initializing" the hardware components. In addition, a startup routine may provide for manual of certain components; however, this document focuses on the automatic configuration process.

Startup routines are usually stored in non-volatile memory known, generally, as ROM. Such startup routines are therefore considered "firmware." Specifically, in a typical conventional personal computer, the processing resources obtain the bulk of the startup routine from an electrically erasable, programmable, read-only memory (EEPROM) module which resides on the computer's motherboard. The startup code contained in the system EEPROM (i.e., the main startup routine) is generally designed to be flexible, in that the same main startup routine can be used to configure systems with different hardware components, including different varieties of adapter cards. (The non-volatile memory that contains the main startup routine is hereinafter simply called the system ROM.) In addition to obtaining instructions from the system ROM, however, the processing resources may also obtain configuration instructions from the adapter cards themselves.

The configuration instructions from the adapter cards are obtained through a process known as a ROM scan. In the ROM scan, the main startup routine searches the ROM (if any) on each adapter card for a configuration routine (i.e., for adapter code). Whenever such code is found, the main startup routine temporarily passes control to the adapter code. The adapter code then alters the system configuration as necessary to support the adapter in question and control is then returned to the main startup routine. This startup methodology maximizes the flexibility of the main startup routine, while facilitating support for wide variations in system hardware.

When the adapter code and the main startup routine are written to utilize the same operating mode, the above methodology works well. For example, most personal computers being manufactured today utilize a default operating mode known as "IA-32 mode" (with "IA" standing for INTEL® Architecture and "32" indicating that 32-bit addresses are supported.) Accordingly, the main startup routines and the adapter code for such systems are designed to execute in IA-32 mode.

However, when advances in the computer arts lead to the adoption of new operating modes, a problem related to adapter code compatibility arises. For example, recent advances have led to the introduction of data processing systems that utilize a new default operating mode, known as "IA-64 mode," instead of the legacy IA-32 operating mode. One difference between IA-32 mode and IA-64 mode is that the latter supports 64-bit addresses. A problem associated with adopting IA-64 mode is that the configuration code on most of the available adapter cards was designed for IA-32 mode, and such code, consequently, can not run in IA-64 mode. In addition, it is expected that adapter cards with IA-64 code will become widely available only after a significant amount of time has elapsed following the introduction of the systems that startup in IA-64 mode.

A need therefore exists for a method and system for executing adapter code in an operating mode that differs from a system's default operating mode. A need also exists for a method and system for supporting adapter cards with legacy adapter code together with adapter cards that are configured in the new operating mode. Furthermore, such systems and methods would realize additional benefits if they also optimized the efficiency of the startup process.

SUMMARY OF THE INVENTION

According to the present invention, a method for configuring a data processing system that contains one or more first nonvolatile memories, one or more second nonvolatile memories, and processing resources that support at least first and second operating modes begins with activation of a first operating mode. One or more secondary configuration routines that utilize a second operating mode are then located within the one or more second nonvolatile memories, and a list that identifies those secondary configuration routines is stored. After the list is stored, one or more primary configuration routines which utilize the first operating mode are located within the one or more first nonvolatile memories and executed. Also, all of the secondary configuration routines that do not correspond to any of the primary configuration routines are demarcated. Thereafter, the second operating mode is activated in lieu of the first operating mode, and the demarcated secondary configuration routines are executed.

In an illustrative embodiment, the primary configuration routines are obtained from system memory, the secondary configuration routines are obtained from adapter memory, and one or more of the primary configuration routines are executed in lieu of one or more corresponding secondary configuration routines.

All objects, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
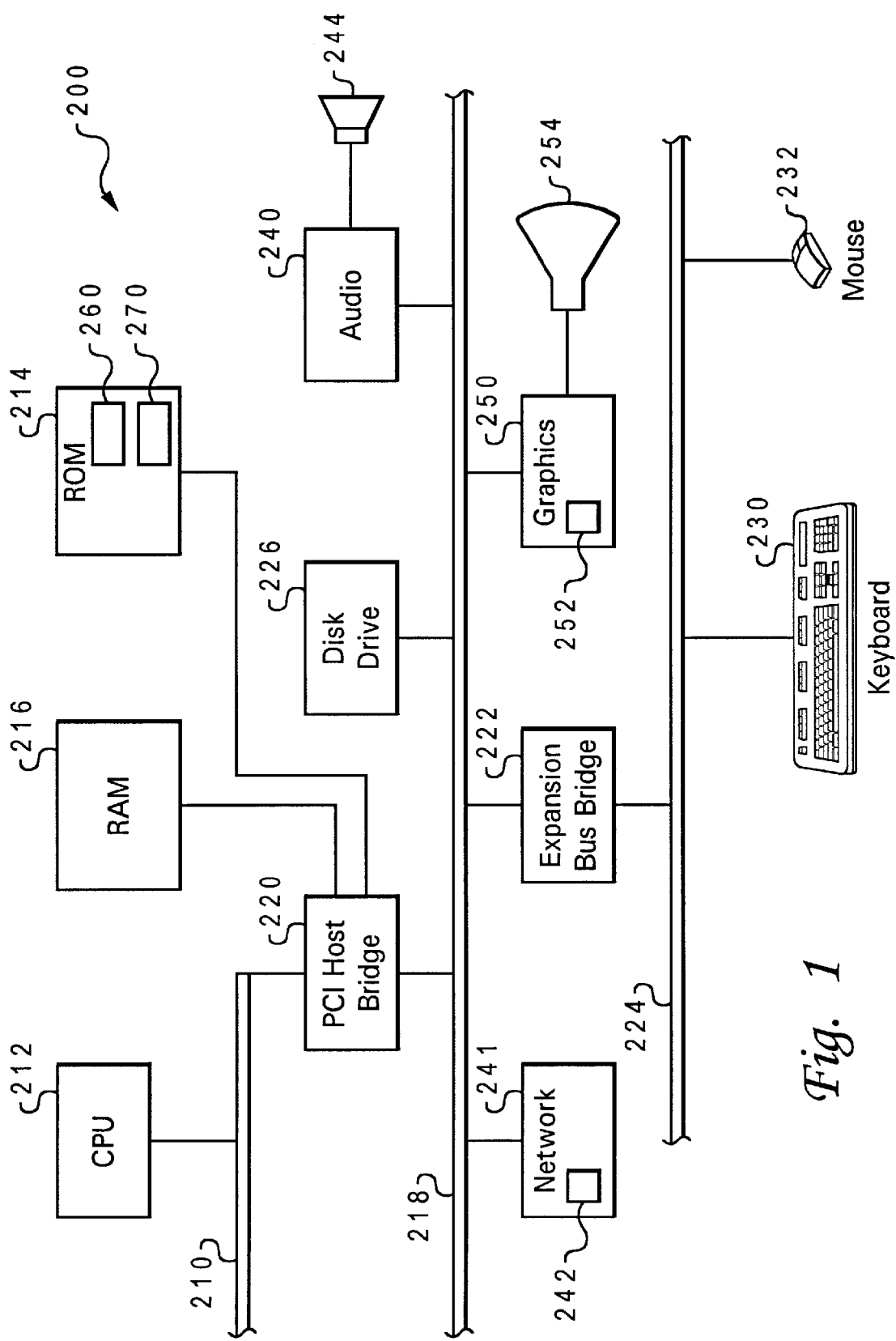
FIG. 1 depicts a block diagram of an illustrative embodiment of a data processing system with facilities for executing adapter configuration routines that utilize different operating modes, in accordance with the present invention.

With reference now to the figures, and in particular with reference to FIG. 1, there is depicted a block diagram of an illustrative data processing system 200 with facilities, in accordance with the present invention, for executing adapter configuration routines that utilize different operating modes. Data processing system 200 is illustrated as a personal computer, including a system bus 210 that is connected to a central processing unit (CPU) 212. According to the present invention, CPU 212 supports at least two operating modes. In the illustrative embodiment, those operating modes are the older, well-known, IA-32 mode, and the newer, IA-64 mode.

System bus 210 is also connected, via a Peripheral Component Interconnect (PCI) host bridge 220, to a PCI local bus 218, and PCI local bus 218 is connected, via an expansion bus bridge 222, to an ISA bus 224. Random access memory (RAM) 216 and a system ROM 214 are also connected to PCI host bridge 220. A keyboard 230 and a mouse 232 for receiving operator input are attached (through appropriate adapters) to ISA bus 224.

PCI local bus 218 is also connected to additional non-volatile data storage devices (such as one or more disk drives 226) and to one or more adapter cards. According to the present invention, at least one of those cards includes ROM with a configuration routine that executes in the legacy operating mode. In addition, processing system 200 may include one or more adapter cards with configuration routines that execute in a newer operating mode. In the illustrative embodiment, IA-32 mode is the legacy mode and IA-64 mode is the newer operating mode. Legacy configuration routines are therefore known as IA-32 configuration routines (or IA-32 adapter code), and configuration routines that execute in the newer operating mode are known as IA-64 configuration routines (or IA-64 adapter code).

In the illustrative embodiment, connected to PCI local bus 218 are an audio adapter 240 which contains no configuration routine, a network adapter 241 which contains an IA-32 configuration routine 242, and a graphics adapter 250 which contains an IA-64 configuration routine 252. Audio adapter 240 and graphics adapter 250 control audio output through a speaker 244 and visual output through a display device 254, respectively. Network adapter 241 provides a port through which data processing system 200 may communicate with other devices, such as other computers within a local area network (LAN) (not illustrated).

In addition to the hardware and software described above, data processing system 200 contains a main startup routine 260, which is stored in system ROM 214. When the system is booted (i.e., started or restarted), main startup routine 260 is automatically loaded and executed by the processing resources (i.e., CPU 212) to prepare the various connected components to work together. In the illustrative embodiment, main startup routine 260 automatically starts operating in IA-64 mode as the default operating mode.

Consequently, in order to optimize performance, main startup routine 260 is designed to run primarily in IA-64 mode. However, it is advantageous for data processing system 200 to be able to utilize adapter cards with legacy configuration routines, as well as adapter cards with configuration routines that utilizes the newer operating mode. Accordingly, main startup routine 260 also includes support for IA-32 adapter code.

A simple but inefficient way to accommodate adapter cards with configuration routines written for different processing modes is to utilize a main startup routine that changes the operating mode whenever adapter code with a different operating mode is detected in the ROM scan. However, since changing the operating mode is very time intensive, it would be better to minimize the number of times that the operating mode is changed.

Accordingly, as described in greater detail below, the present invention provides a more efficient process for handling adapter cards with configuration routines written for different processing modes—a process which minimizes the number of times the operating mode is changed. In addition, the present invention includes a mechanism for executing newer (e.g., IA-64) configuration routines in lieu of legacy (e.g., IA-32) configuration routines. This mechanism therefore allows an adapter card to be configured with a configuration routine that has been updated (relative to the adapter card's onboard configuration routine). This mechanism allows configuration routines to be added (in effect) to adapter cards that lack configuration routines. Furthermore, in some cases this mechanism maximizes efficiency by allowing the entire configuration process to be performed in the new processing mode. Before this process is treated in detail, however, it may be helpful to introduce some of the data structures utilized in an illustrative embodiment of this process.

Figure 2:
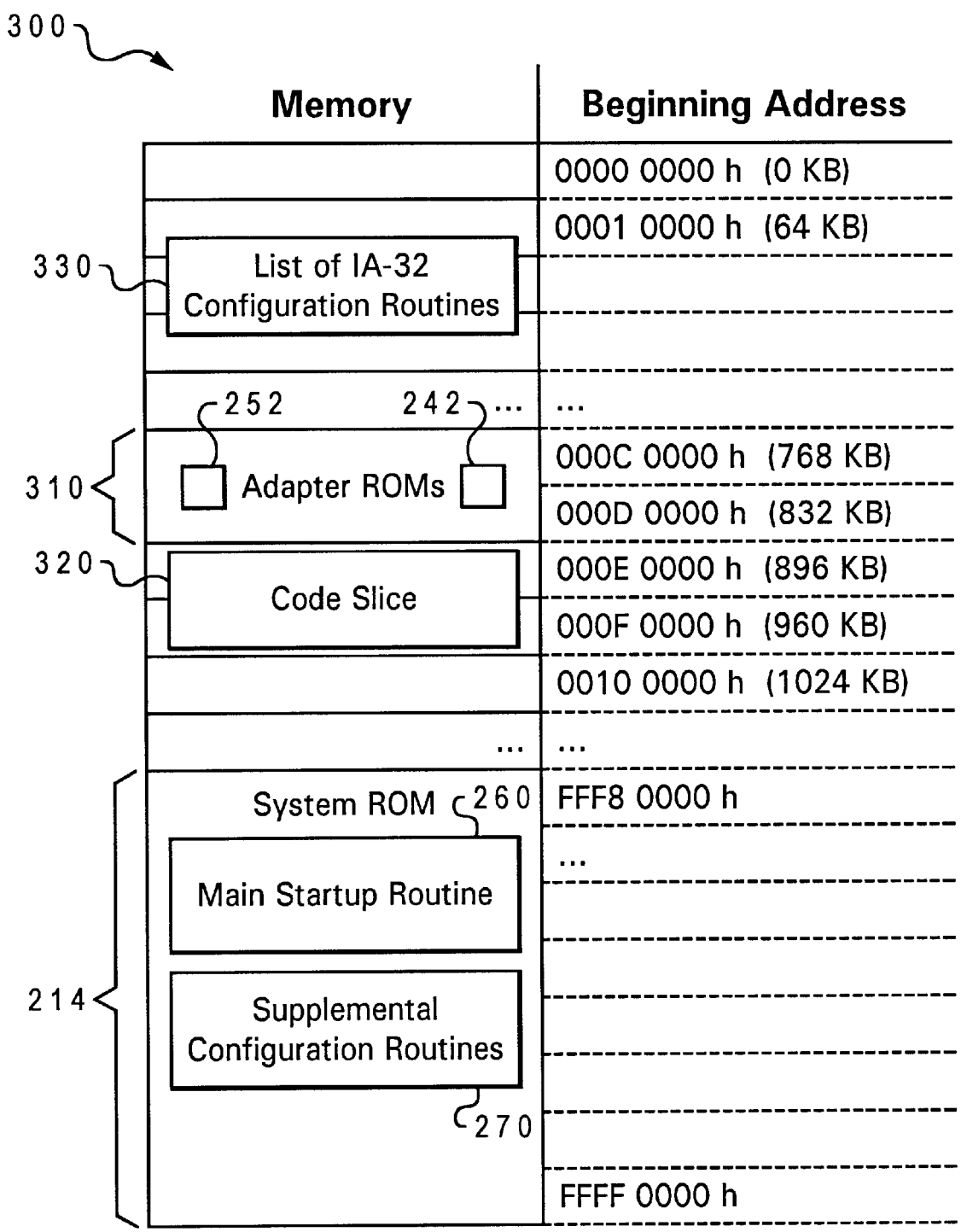
FIG. 2 illustrates an exemplary set of structures stored in the memory address space of the system depicted in FIG. 1.

Consequently, referring now also to FIG. 2, there is illustrated a memory diagram 300 which shows the locations of various data structures that are utilized in the process of configuring data processing system 200, according to the illustrative embodiment. As depicted, just below the 4 gigabyte (GB) memory address is a 512 kilobyte (KB) range of memory addresses that are mapped to ROM 214. Therefore, the contents of ROM 214 can be accessed by reference to memory addresses starting at FFF80000(h). In addition, the 128 KB memory address range that starts at 768 KB is mapped onto adapter ROMs 310. Consequently, IA-32 configuration routine 242 (from network adapter 241) and IA-64 configuration routine 252 (from graphics adapter 250) are visible in that 128 KB range.

As illustrated in FIGS. 1 and 2, in addition to main startup routine 260, system ROM 214 may contain one or more supplemental configuration routines 270. As described in greater detail below, each supplemental configuration routine 270 may act as a replacement configuration routine, being executed in lieu of an IA-32 configuration routine on a legacy adapter card, or as an enhancement configuration routine, being executed (in IA-64 mode) to configure an adapter card that contains no onboard configuration routine. Due to the memory mapping strategy, both main startup routine 260 and one or more supplemental configuration routines 270 are visible within the 512 KB range that start at FFF80000(h). In addition, if system ROM 214 contains insufficient space to accommodate all of the desired supplemental configuration routines 270, one or more supplemental configuration routines 270 may be provided on hardware (such as a supplemental, nonvolatile storage device) that is accessible via memory addresses just below FFF80000(h).

Figure 3A:
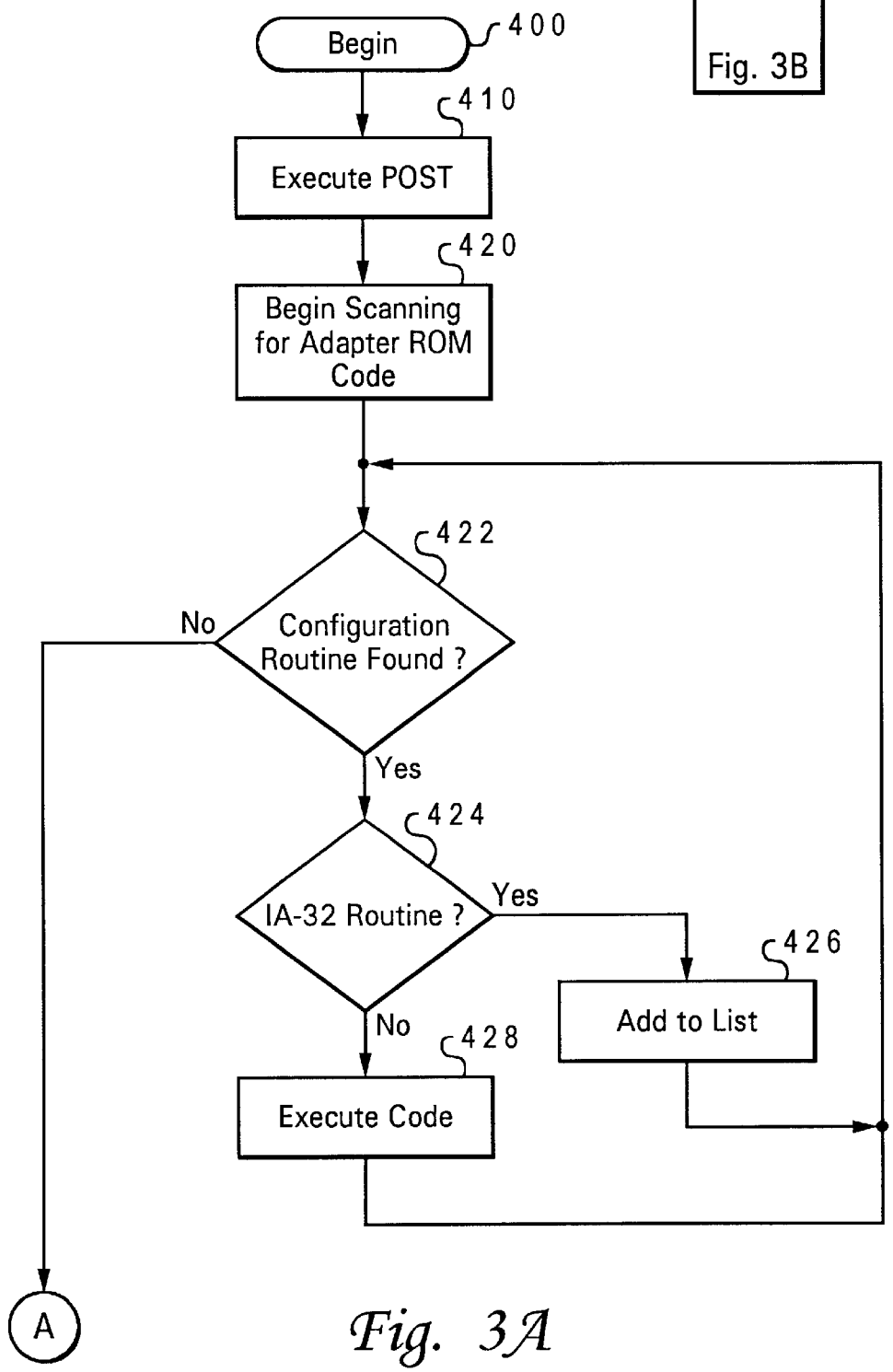
FIGS. 3A and 3B depict a flowchart of an illustrative process for executing adapter configuration routines that utilize different operating modes, in accordance with the present invention.
Figure 3B:
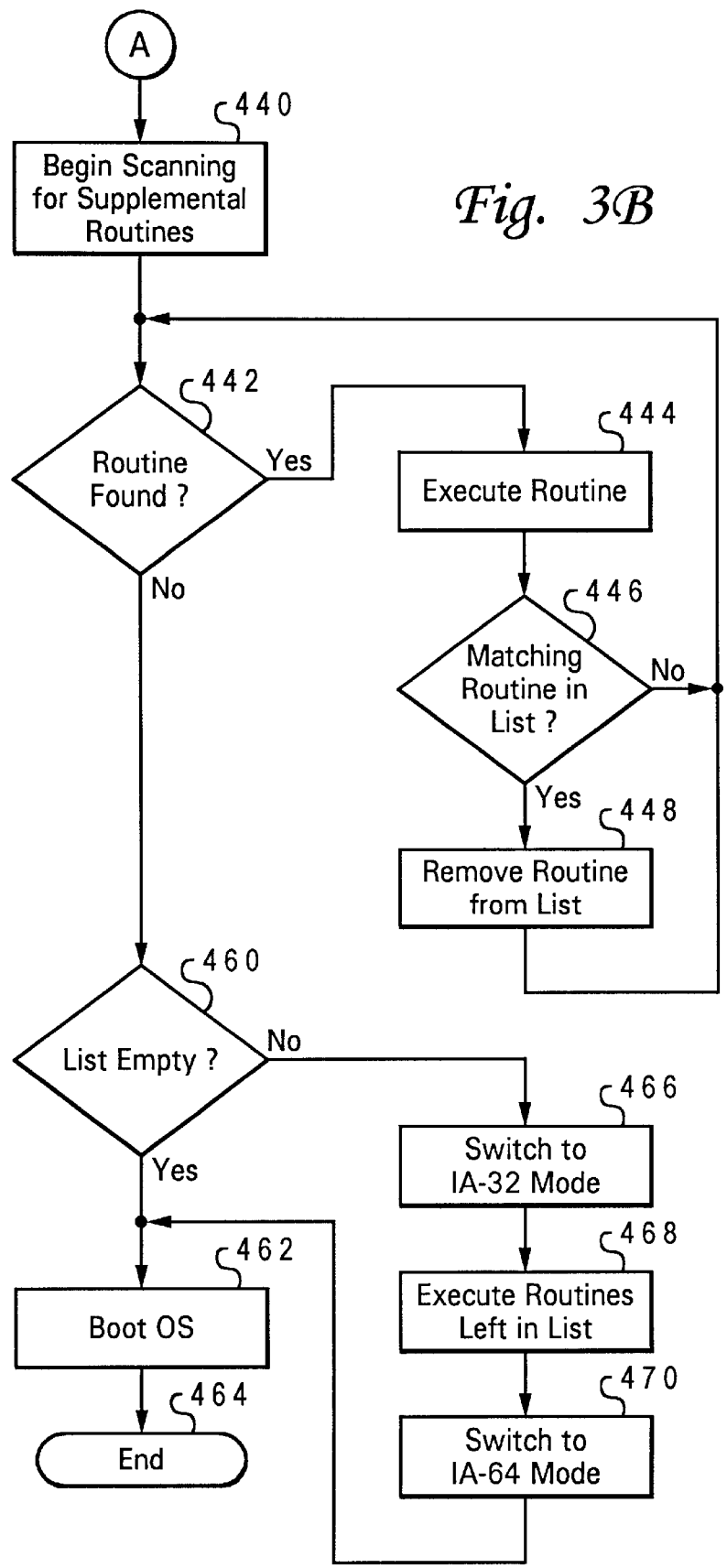

With reference now also to FIGS. 3A and 3B, there is illustrated an exemplary process, in accordance with the present invention, for executing configuration routines in different operating modes. That process begins at block 400 with data processing system 200 being started or restarted, which causes CPU 212 to begin executing main startup routine 260 in IA-64 mode. For example, CPU 212 may begin executing main startup routine 260 by copying a 128 KB code slice 320 from the memory addresses that are mapped to system ROM 214 into RAM 216—specifically, into a memory range starting at the address 896 KB. As shown at block 410, as part of the initial stage of the configuration process, main startup routine 260 also executes a power-on self test (POST) to verify that the hardware components are operating properly.

After the hardware has been tested and code slice 320 has been stored below the 1 MB address, main startup routine 260 begins scanning adapter ROMs 310 for adapter code, as depicted at block 420. For example, main startup routine 260 may examine segments of memory at predetermined intervals for a certain value (such as the hexadecimal value 55AA). The process then passes to block 422, which illustrates main startup routine 260 determining whether a configuration routine has been found. If so, main startup routine 260 determines whether that routine is designed to be executed in IA-32 mode, as illustrated at block 424. If so, main startup routine 260 does not immediately call the configuration routine but, instead, stores a record in a list of IA-32 configuration routines 330 (hereinafter, legacy list 330) in RAM 216 identifying the found routine, as depicted at block 426. In particular, the stored record includes the starting address of the configuration routine and may include the PCI device identifier (ID) of the adapter. The record also includes the PCI subsystem ID and the PCI subsystem vendor ID of the adapter, which are obtained by enumerating the channel for the adapter card in question, in a manner well known in the art. For example, when main startup routine 260 finds IA-32 configuration routine 242, a record for that routine will be stored.

However, if the configuration routine is not an IA-32 configuration routine, it is assumed that the configuration routine is designed to be executed in IA-64 mode, and main startup routine 260 therefore causes that routine to be executed (in IA-64 mode), as shown at block 428. For example, when IA-64 configuration routine 252 is found, main startup routine 260 will call that routine. After the found configuration routine has been executed, control returns to main startup routine 260, which continues to scan for configuration routines by returning to block 422 to determine whether another configuration routine can be found in adapter ROMs 310.

Once it is determined at block 422 that adapter ROMs 310 contain no more configuration routines to process, the process passes through page connector A to block 440. As illustrated at block 440, main startup routine 260 then begins scanning system ROM 214 for supplemental configuration routines, for instance by examining a predetermined location or locations and/or by scanning for a particular code or signature. The process then passes to block 442, which illustrates main startup routine 260 determining whether a supplemental configuration routine has been found. If one has, the found routine is executed to configure a corresponding adapter card, as depicted at block 444. In addition, as shown at block 446, main startup routine 260 determines whether legacy list 330 contains a record for the adapter card that was just configured using IA-64 code. If so, the record for that card is removed from legacy list 330, as depicted at block 448. Then, after the record has been removed, or after it is determined that legacy list 330 contains no such record, main startup routine 260 returns to block 442 to begin processing the next supplemental routine from system ROM 214.

Once main startup routine 260 determines that there are no more supplemental configuration routines to process, the process passes to block 460. As illustrated at block 460, main startup routine 260 then determines whether legacy list 330 is empty. If so, the process passes to block 462, which illustrates main startup routine 260 causing data processing system 200 to boot an operating system, and the process then ends, as shown at block 464.

However, if it is determined at block 460 that legacy list 330 is not empty, main startup routine 260 causes the operating mode to be swapped from IA-64 mode to IA-32 mode, as shown at block 466. All of the routines identified in legacy list 330 are then executed, as depicted at block 468. Then, after all of those routines have been executed and control has returned from the last configuration routine, main startup routine 260 switches the operating mode back to IA-64 mode, as shown at block 470, before the operating system is booted, as described above.

Consequently, even if no supplemental configuration routines reside in system ROM 214, the present invention optimizes the efficiency of the boot process by swapping to IA-32 mode no more than once, even if more than one IA-32 configuration routine is to be executed. In addition, if system ROM 214 has been flashed with a supplemental configuration routine for a legacy adapter card (such as network adapter 241, a Small Computer System Interface (SCSI) card for connecting SCSI drives to data processing system 200, etc.), the present invention utilizes the supplemental routine instead of the IA-32 routine residing on the adapter card. The present invention therefore allows configuration routines for legacy adapter cards to be improved, in effect, without actually modifying the legacy adapter card. The present invention also obviates the need to swap out of IA-64 mode if system ROM 214 has been populated with supplemental configuration routines corresponding to all of a system's IA-32 configuration routines.

Furthermore, the present invention provides for execution of a supplemental configuration routine for an adapter card with no previous configuration routine. The present invention therefore provides for customization of the configuration settings of an adapter card that otherwise might simply be configured according to default basic input/output system (BIOS) settings.

While the invention has been particularly shown and described with reference to an illustrative embodiment, it will be understood by those skilled in the art that various changes in form and detail may be made therein without departing from the spirit and scope of the invention. For example, although the various memories are mapped to certain memory addresses in the illustrative embodiment, that mapping could readily be altered without departing from the spirit of the present invention. For instance, although system ROM 214 is shown as being mapped into memory addresses just below the 4 GB mark (which is the maximum amount of memory addressable by 32 bits), in systems with other architectures (such as 64-bit systems), the system ROM may be mapped to a higher region. Similarly, an additional area in the memory address space could be identified for accessing supplemental configuration routines.

Also, system ROM 214 is described as an EEPROM, but alternative memory technologies (such as compact flash cards) could be used in place of, or in addition to, an EEPROM. In addition, data processing system 200 has been described as a personal computer with a single CPU, but different architectures, including data processing systems with multiple CPUs, could benefit from the present invention as well. Likewise, although the adapter cards in the illustrative embodiment are PCI adapter cards, the present invention could also be utilized with cards designed for other bus architectures. Those of ordinary skill in the art will therefore appreciate that the present invention is not limited to the specific architecture illustrated.

What is claimed is:

1. A method for configuring a data processing system that contains one or more first nonvolatile memories, one or more second nonvolatile memories, and processing resources that support at least first and second operating modes, said method comprising:

activating said first operating mode;

finding, within said one or more second nonvolatile memories, one or more secondary configuration routines that utilize said second operating mode;

storing a list that identifies said one or more secondary configuration routines;

locating, within said one or more first nonvolatile memories, one or more primary configuration routines that utilize said first operating mode;

executing said one or more primary configuration routines;

demarcating at least one of said one or more secondary configuration routines that do not correspond to any of said one or more primary configuration routines;

swapping from said first operating mode into said second operating mode only after said steps of finding, storing, locating, executing, and demarcating; and thereafter, executing said demarcated secondary configuration routines.

2. The method of claim 1, wherein:
said one or more second nonvolatile memories comprise one or more adapter memories; and
said step of finding said one or more secondary configuration routines comprises searching said one or more adapter memories for said one or more secondary configuration routines.

3. The method of claim 1, wherein:
said one or more first nonvolatile memories comprise a system memory; and
said step of locating said one or more primary configuration routines comprises searching said system memory for said one or more primary configuration routines.

4. The method of claim 1, wherein:
said one or more primary configuration routines include one or more replacement configuration routines;
said step of demarcating comprises matching each of said one or more replacement configuration routines with a corresponding secondary configuration routine; and
said step of executing said demarcated secondary configuration routines comprises only executing secondary configuration routines that do not match any of said replacement configuration routines.

5. The method of claim 1, wherein said step of storing comprises recording an address and a device identifier for each of said one or more secondary configuration routines.

6. The method of claim 1, further comprising:
swapping back to said first operating mode after said step of executing said demarcated secondary configuration routines; and
thereafter, loading an operating system.

7. The method of claim 1, wherein:
said one or more primary configuration routines comprise at least one IA-64 configuration routine;
said one or more secondary configuration routines comprise at least one IA-32 configuration routine;
said step of locating said one or more primary configuration routines comprises locating said at least one IA-64 configuration routine; and
said step of finding said one or more secondary configuration routines comprises finding said at least one IA-32 configuration routine.

8. A data processing system comprising:
processing resources in communication with one or more first nonvolatile memories and in communication with one or more second nonvolatile memories, wherein said processing resources support at least first and second operating modes;

one or more first configuration routines and one or more secondary configuration routines stored, respectively, in said one or more first nonvolatile memories and said one or more second nonvolatile memories;

scanning logic that finds said one or more secondary configuration routines;

storing logic that stores a list identifying said one or more secondary configuration routines;

primary execution logic that causes said processing resources to execute said primary configuration routines;

demarcation logic that demarcates all of said secondary configuration routines that do not correspond to any of said primary configuration routines;

a startup routine that maintains said first operating mode while said scanning logic, said storing logic, said primary execution logic, and said demarcation logic execute; and secondary execution logic that causes said demarcated secondary configuration routines to execute in said second operating mode after said scanning logic, said storing logic, said primary execution logic, and said demarcation logic have executed.

9. The data processing system of claim 8, wherein said one or more secondary memories comprise one or more adapter memories that contain said one or more secondary configuration routines.

10. The data processing system of claim 8, wherein said one or more first nonvolatile memories comprise a system memory that contains said one or more primary configuration routines.

11. The data processing system of claim 8, wherein:
said one or more primary configuration routines include one or more replacement configuration routines;
said demarcation logic matches each of said one or more replacement configuration routines with a corresponding secondary configuration routine; and
said secondary execution logic causes said processing resources to execute only secondary configuration routines that do not match any of said replacement configuration routines.

12. The data processing system of claim 8, wherein said storing logic stores an address and a device identifier for each of said one or more secondary configuration routines.

13. The data processing system of claim 8, wherein:

said startup routine swaps said data processing system back to said first operating mode after said demarcated secondary configuration routines have been executed; and said startup routine thereafter causes said data processing system to load an operating system.

14. The data processing system of claim 8, wherein:

said one or more primary configuration routines comprise at least one IA-64 configuration routine; and said one or more secondary configuration routines comprise at least one IA-32 configuration routine.

15. A program product for configuring a data processing system with processing resources, one or more first nonvolatile memories, and one or more second nonvolatile memories, wherein said processing resources support at least first and second operating modes, said program product comprising:

scanning logic that finds one or more secondary configuration routines that utilize said second operating mode;

storing logic that stores a list identifying said one or more secondary configuration routines;

primary execution logic that causes said processing resources to execute one or more primary configuration routines;

demarcation logic that demarcates all of said secondary configuration routines that do not correspond to any of said one or more primary configuration routines;

a startup routine that keeps said processing resources in said first operating mode while said scanning logic, said storing logic, said primary execution logic, and said demarcation logic execute, wherein said startup routine includes said scanning logic, said storing logic, said primary execution logic, and said demarcation logic;

secondary execution logic within said startup routine that causes said demarcated secondary configuration routines to execute in said second operating mode after said scanning logic, said storing logic, said primary execution logic, and said demarcation logic have executed; and computer usable medium encoding said startup routine.

16. The program product of claim 15, wherein:

said one or more second nonvolatile memories comprise one or more adapter memories; and said scanning logic finds said one or more s secondary configuration routines by scanning said one or more adapter memories.

17. The program product of claim 15, wherein:

said one or more first nonvolatile memories comprise a system memory; and said primary execution logic causes said processing resources to obtain said one or more primary configuration routines from said system memory.

18. The program product of claim 15, wherein:

said one or more primary configuration routines include one or more replacement configuration routines;

said demarcation logic matches each of said one or more replacement configuration routines with a corresponding secondary configuration routine; and said secondary execution logic causes said processing resources to execute only secondary configuration routines that do not match any of said replacement configuration routines.

19. The program product of claim 15, wherein said storing logic stores an address and a device identifier for each of said one or more secondary configuration routines.

20. The program product of claim 15, wherein said startup routine comprises:

swap back logic that swaps said data processing system back to said first operating mode after said demarcated secondary configuration routines have been executed; and operating system initiation logic that causes said data processing system to load an operating system after said processing mode has been swapped back to said first operating mode.

21. The program product of claim 15, wherein:

said one or more primary configuration routines comprise at least one IA-64 configuration routine;

said one or more secondary configuration routines comprise at least one IA-32 configuration routine;

said primary execution logic causes said processing resources to execute said at least one IA-64 configuration routine; and said secondary execution logic causes said processing resources to execute said at least one IA-32 configuration routine.

22. A data processing system comprising:

processing resources that support first and second operating modes;

memory containing one or more primary configuration routines and one or more secondary configuration routines; and means for executing all of said primary configuration routines while said processing resources maintain said first operating mode;

means for determining which of said secondary configuration routines do not correspond to any of said primary configuration routines;

means for swapping from said first operating mode to said second operating mode; and means for executing, in said second operating mode, said one or more secondary configuration routines that do not correspond to any of said primary configuration routines.

23. The data processing system of claim 22, wherein said memory comprises:

system memory that contains said primary configuration routines; and adapter memory that contains said secondary configuration routines.

\* \* \* \* \*